Sept. 20, 1932.  H. R. HOLMES  1,878,851
DUMP TRUCK
Filed Dec. 3, 1931  2 Sheets-Sheet 1

Inventor
Harleigh R. Holmes.
By A. J. O'Brien
Attorney

Sept. 20, 1932.  H. R. HOLMES  1,878,851
DUMP TRUCK
Filed Dec. 3, 1931   2 Sheets-Sheet 2
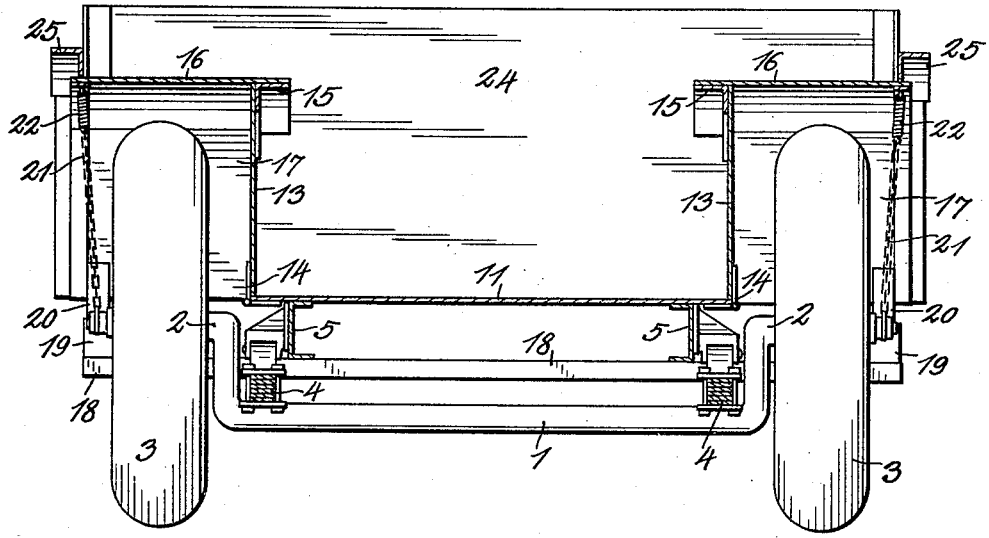
Fig. 4.
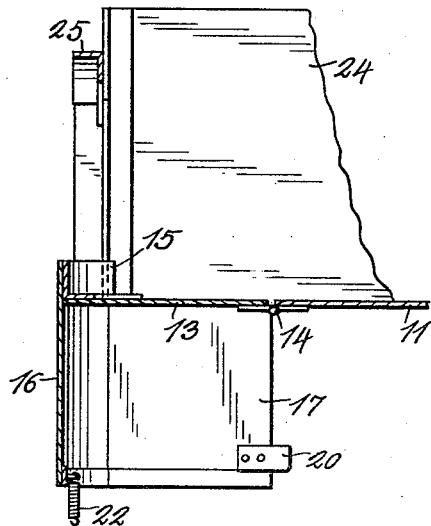
Fig. 5.
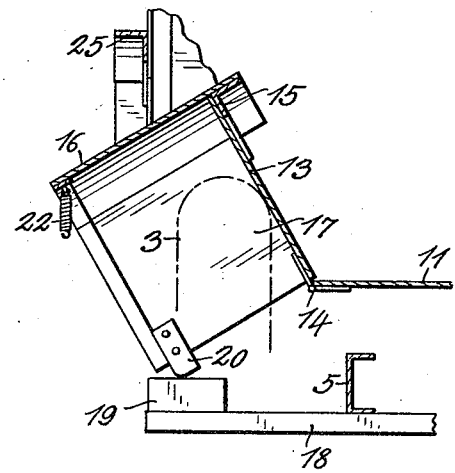
Fig. 6.
Inventor
Harleigh R. Holmes.
By 
Attorney Patented Sept. 20, 1932

1,878,851

UNITED STATES PATENT OFFICE

HARLEIGH R. HOLMES, OF LITTLETON, COLORADO

DUMP TRUCK

Application filed December 3, 1931. Serial No. 578,735.

This invention relates to improvements in dump trucks of the kind employed for hauling material that can be discharged by tilting the body so as to dump the material on the ground, as, for example, sand, gravel, coal, etc.

In transporting heavy material, such as mentioned above, the material is frequently loaded into the truck by hand and therefore when the trucks are constructed in the usual way with the bottom of the truck body or box above the top of the wheels, the material must be raised very high before it can be deposited in the box and this makes the loading very laborious and tiresome.

It is the object of this invention to produce a truck of the type indicated, which shall be so constructed that the bottom of the body or box shall normally lie in a plane below the top of the wheels so as to make the truck as low as possible. In order to have the capacity of the body as large as possible, the width is made somewhat greater than the distance between the outside of the wheels. It is apparent that where such a body is used, the wheels must each be enclosed in a housing or fender and if this is made immovable with respect to the box, then it will prevent the material from being successfully dumped because these housings will project upwardly into the body and serve as obstructions.

It is one of the objects of this invention to produce a dumping truck having a body located as indicated and in which the housings or fenders are so constructed that when the truck is dumped they will automatically move into a position in which they offer no obstructions to the discharge of material from the truck.

This invention, briefly described, consists of a truck which is preferably of the front wheel drive type and in which the rear wheels are connected by an axle that is bent downwardly intermediate its ends so as to form a low support for the chassis frame. Supported on the chassis frame is a body or box that is pivotally attached to the same at a point directly to the rear of the rear wheels. Means is provided for tilting the box about its pivot into a position in which the material comprising the load will slide downwardly and in this way the load can be readily discharged in the usual manner. The bottom of the box is normally located below the top of the wheels and the width of the box is greater than the distance between the outside of the wheels. The bottom is provided with openings through which the wheels extend and those portions of the wheel that project into the box are covered by means of housings that are hingedly connected to the bottom of the box in such a way that when the box is tilted, the housings will tilt outwardly about their pivotal connections and finally assume a position in which the side that is normally vertical, will lie substantially in the same plane as the bottom of the box, thereby permitting the material to be readily discharged.

Having thus briefly described this invention, the same will now be described in detail and for this purpose reference will be had to the accompanying drawings in which a truck constructed in accordance with this invention has been illustrated, and in which:

Fig. 4 is a section taken on line 4—4, Fig. 1, and shows the position of the housings when the body is in normal position;

Fig. 5 is a section taken on line 5—5, Fig. 2, and shows the position of the housings when the body is in dumping position; and Fig. 6 is a section similar to that shown in Fig. 5, but showing the position of the housings shortly before the body is returned to the normal position and also a short time after the tilting of the body has commenced.

Figure 1:
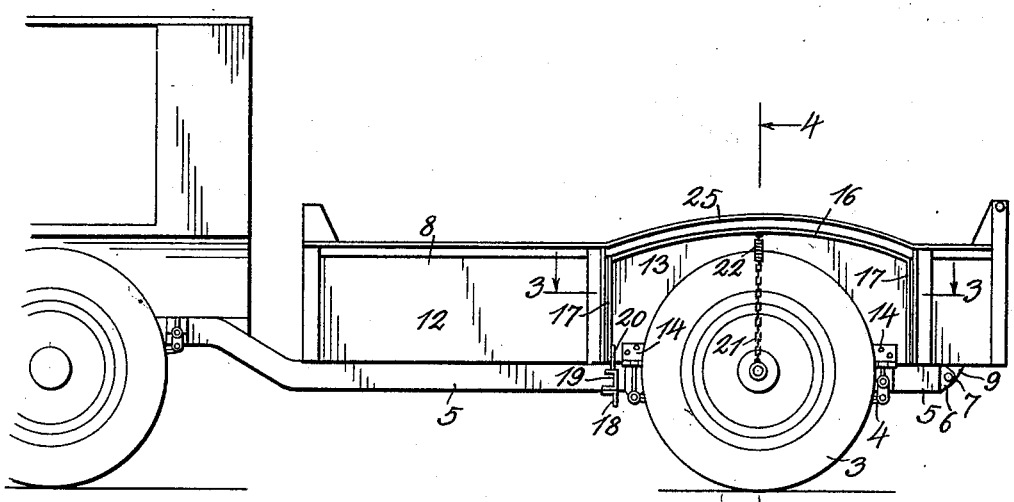
Fig. 1 is a side elevation of a truck made in accordance with this invention.

In the drawings reference numeral 1 indicates the rear axle of the truck. In the specific embodiment illustrated, the truck is of the front wheel drive type and therefore the rear axle can be formed from a single piece of steel which is bent downwardly intermediate its ends. The axle is provided with journals 2 on which the wheels 3 are mounted.

Figure 2:
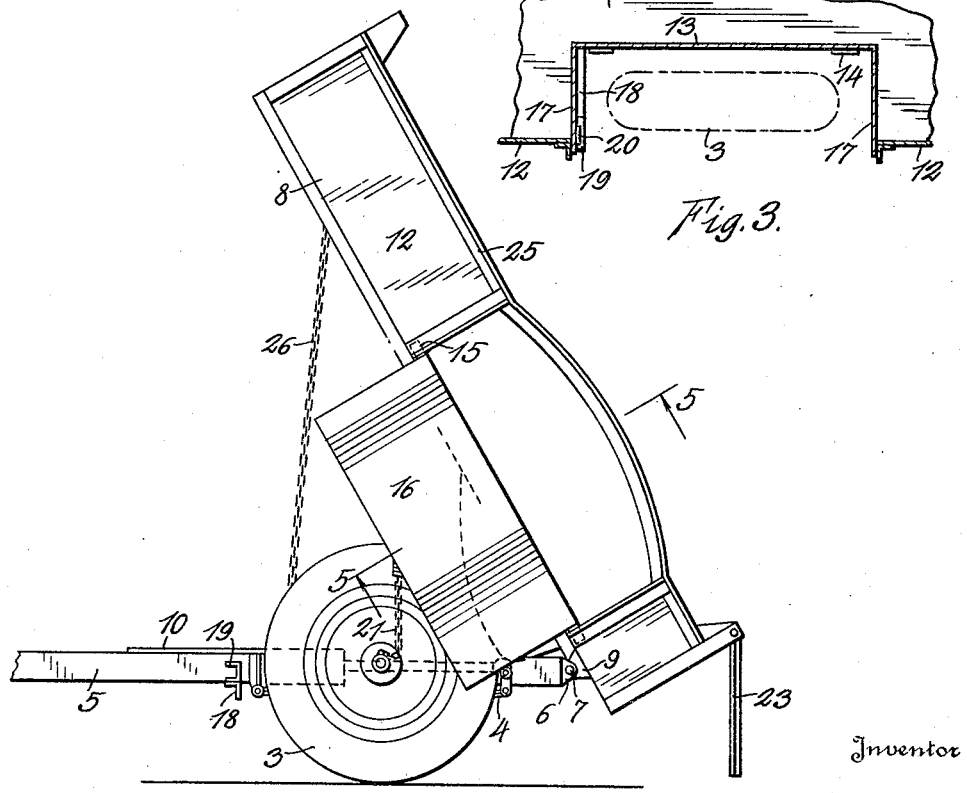
Fig. 2 is a side elevation showing the truck body in dumping position and showing the position of the wheel housings during the dumping operation.

Secured to the axle are springs 4 and these serve to support a chassis frame whose side members have been indicated by reference numerals 5. At the end of the chassis frame are brackets 6 that are perforated for the reception of pivots 7 and supported on the chassis frame is a body or box 8 that is provided at its rear end with downwardly extending brackets 9 that are pivoted to the pin 7. A hoisting mechanism such, for example, as an ordinary Woods horizontal hydraulic hoist is provided for tilting the body about the pivot 7. In Fig. 2 the cylinder of the hoist has been shown and designated by reference numeral 10. As the specific tilting or hoisting mechanism forms no part of this invention, it will not be described in detail and has only been indicated in a general way for the purpose of showing its relation to the other parts of the mechanism.

Figure 3:
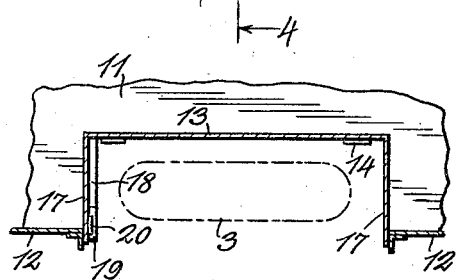
Fig. 3 is a section taken on line 3—3, Fig. 1.

The body is provided with a bottom 11 and sides 12. The sides are spaced apart a distance somewhat greater than the distance between the outside of the wheels and since the bottom is located below the top of the wheels it has been provided with openings through which the wheels project in the manner shown in Fig. 3. For the purpose of enclosing the upper portions of the wheels, a housing is provided for each wheel. In the example given these housings comprise each a vertical plate 13 that is connected at its lower edge to the bottom 11 by means of hinges 14. The upper edge of plate 13 has been shown as reenforced by an angle iron 15. A top plate 16 is secured to the upper flange of the angle iron and projects outwardly to a point slightly beyond the outer surface of the sides 12. The front and rear ends of the plate 13 are provided with members 17 as shown more clearly in Fig. 3. The housings are of such size that when the dump body is in normal position, as shown in Figs. 1 and 4, they enclose the wheels, but when the body is raised or tilted into discharging position the housings move about the pivots of the hinges from the position shown in Fig. 4 to that shown in Fig. 6 and finally to the position shown in Fig. 5. It will be seen from Fig. 5 that when the box is in fully tilted position, the plate 13 lies in the same plane as the bottom 11 and the ends of the angle irons 15 fit into the corner of the box between the sides and the bottom and serve as stops for positively holding the housing against further outward and downward movement. When the box is tilted into the position shown in Fig. 2 and the housings are in the position shown in Fig. 5, it is evident that the load is free to slide downwardly because the housings have been moved into a position in which they form no obstruction whatsoever. Part of the load will naturally be discharged outwardly over the housings, but this is not objectionable as with the type of work being done, the small discharge through the side openings is immaterial.

Attention is called, however, to the fact that the angles 15 project upwardly when the housings are in the position shown in Fig. 5 and therefore they serve as stops which limit the outflow of material to a great extent.

Let us now assume that the body is in the dumping position shown in Fig. 2 and that it is desired to return the same to normal position. The tilting mechanism is reversed whereupon the body slowly settles down towards the chassis frame. As the body returns to normal position, the undersides of plates 13 come in contact with the upper surfaces of the hind wheels and as the body moves downwardly the housings are moved upwardly in the manner quite clear from Fig. 6. When the body comes within a short distance from normal position, the housings are moved independently of the wheels by means of cams which will now be described.

Secured to the under surface of the chassis frame are angles or channel beams 18 that project outwardly beyond the outside of the wheels. Secured to the outer ends of these beams are blocks or cams 19 that extend upwardly a short distance. Secured to the end members 17 are lugs or projections 20 that move into engagement with the upper surfaces of the cams 19 as the body approaches its normal position and when the body has reached normal position the housings assume the position shown in Fig. 4 and are held in this position by the action of the cams 19 and lugs 20. It will be seen from the description just given that the action of the housings are entirely automatic and the driver of the truck does not have to give this part of the mechanism any attention as the housings will automatically move outwardly when the dumping begins and be returned to normal position when the body is returned to the position shown in Fig. 1.

In order to assist the housings in starting when the tilting first commences, I have provided means comprising chains 21 whose lower ends are connected to the outer ends of the journals 2 of the rear axle and whose upper ends are connected by means of springs 22 to the outer edge 16. The action of the chain and springs serves to impart to the housings a tendency to turn outwardly which prevents them from sticking as they sometimes might with certain kinds of loads.

The body is provided with the usual tilting end gate 23 and has a front end wall 24. The body is also reenforced at its upper edges by means of angle irons 25 or some similar reenforcing material. The chain indicated by reference numeral 26 merely serves as a stop to limit the tilting of the body.

It will be seen from the above description that by means of the simple expedient of hinging the housings that enclose the wheels, a dump body can be constructed of any width and located as low as consistent with other structural features without in the least interfering with the unloading operation and it is therefore possible to build a dumping truck having a very low body and this in turn makes it easier to load the same and this is a great consideration when the loading is effected by hand, as the amount of work done by a person shoveling is directly proportional to the height to which he must lift the material. Even where trucks of this type are employed with steam shovels, the low center of gravity obtained by this construction makes the truck ride better and eliminates the danger of tipping which is always present where the load is located high above the ground.

Although I have shown a construction in which the wheel housings are tiltably secured to the body, I wish it to be understood that this is merely an example and that my invention broadly includes any construction in which the wheels project into the interior of the body and are protected by means of housings which move relative to the body as the latter is tilted into a position in which they are removed entirely from the interior so as not to serve as obstructions when the truck is unloaded.

Having described the invention what is claimed as new is:

1. In a dump truck having a rear axle, a rear supporting wheel at each end thereof and a chassis frame supported in part by the rear axle, a body supported by the chassis frame and movable with respect to the latter about pivots located to the rear of the rear wheels and whose axis is parallel with the axle, means for tilting the body about its pivotal connection, the bottom of the body being normally located below the tops of the wheels and when in tilted position above the wheels, the body being wider than the distance between the wheels and provided with cut-out portions in the bottom and sides for the reception of those portions of the wheels that project above the bottom and a housing for the upper portion of each of the wheels, said housings having a vertical wall member hinged at its lower edge to the bottom of the body and movable from a position substantially perpendicular to the plane of the bottom to a position substantially in the plane of the bottom, the vertical wall member having a top and two ends, and means for returning the housing to normal position when the body is returned to normal position.

2. In a dump truck, in combination, a rear axle, wheels at each end of the axle, a chassis frame having its rear end supported by the rear axle and a body pivoted to the frame so as to tilt about an axis parallel with the rear axle, means for tilting the body, the body being wider than the distance between the rear wheels and provided on opposite sides with openings in the bottoms for the reception of the wheels, a housing for each wheel, said housing comprising a plate hinged to the bottom of the body along the inner edge of the opening, two end members and a top secured to the plate and forming a fender enclosing the wheel, means for tilting the body whereby the fenders will turn about their hinges through an angle of substantially ninety degrees, a stop for holding the pivoted plate in the plane of the bottom, and means for holding the fenders in operative position when the body is in normal position.

3. In a truck, in combination, a rear axle, a wheel at each end of the axle, a chassis frame supported at one end by the axle, a dump body supported on the frame, the body being wider than the distance between the wheels and when in normal position having its bottom in a plane that intersects the wheels, a pivotal connection between the body and the frame, the axis of the pivot being parallel to the axle and located to the rear of the latter, means for tilting the body into an inclined position in which the plane of the bottom does not intersect the wheels, the bottom of the body having an opening on each side for the reception of the wheels when the body is in normal position, a housing for each wheel, said housing having a plate whose lower edge is hinged to the bottom along the edge of the wheel opening, two end members and a top member being attached to the plate for enclosing the ends and the top of the wheels, means for holding the housing in normal position when the body is in normal position and means for holding the housing with the plate in the plane of the bottom of the housing when the body is in tilted position.

In testimony whereof I affix my signature.

HARLEIGH R. HOLMES.